United States Patent [19]

Akaiwa et al.

[11] Patent Number: 5,721,990
[45] Date of Patent: Feb. 24, 1998

[54] IMAGE FORMATION APPARATUS

[75] Inventors: Masao Akaiwa; Haruyoshi Yamada; Hirohisa Nakano, all of Suwa, Japan

[73] Assignee: Seiko Epson Corporation, Tokyo, Japan

[21] Appl. No.: 547,860

[22] Filed: Oct. 25, 1995

[30]  Foreign Application Priority Data

Oct. 26, 1994 [JP] Japan .................................. 6-262531
Oct. 3, 1995 [JP] Japan .................................. 7-256622

[51] Int. Cl.$^6$ .................................................. G03B 17/24
[52] U.S. Cl. .......................... 396/310; 396/317; 396/318; 349/110
[58] Field of Search ..................................... 354/105, 106; 359/67, 72; 396/310, 315, 316, 317, 318; 349/86, 110

[56]  References Cited

U.S. PATENT DOCUMENTS

| | | | |
|---|---|---|---|
| 4,232,956 | 11/1980 | Hashimoto et al. | 354/106 |
| 4,361,388 | 11/1982 | Micak et al. | 354/106 |
| 4,552,437 | 11/1985 | Gantenbrink et al. | 359/67 |
| 5,434,688 | 7/1995 | Saitoh et al. | 359/67 |
| 5,517,266 | 5/1996 | Funaki et al. | 354/106 |

*Primary Examiner*—Eddie C. Lee

[57]  ABSTRACT

Camera image data transfer device 1 of the present invention allows for the assembly of its components, with one component on top of another from the bottom up in one direction: liquid crystal display device for data transfer 6 is mounted in recess 28 on the inner side of first base 2; then, circuit board 5 and second base 3 are placed on top of it in this order; next, liquid crystal monitor display device 7 is mounted on the outer side of the second base; and finally fixture 8 securely fixes the display device to the second base. The whole device is fixed by securing the ends of dowels 21–27 to second base 3 with going through the entire structure and being extended from first base 2. Thus, the structure of the present invention facilitates assembly and produces fewer defects. Since liquid crystal monitor display device 7 can be mounted from the outside of second base 3, the light blocking base 302 can be formed in one body with second base 3, which eliminates the need for a special component for blocking external light which is required by the conventional structure.

25 Claims, 9 Drawing Sheets

IMAGE FORMATION APPARATUS

BACKGROUND OF THE INVENTION

The present invention generally relates to an image data transfer device that is integrated into a camera for transferring image data, such as date and time, to photographic film loaded in the camera, and more particularly, to a configuration for assembling the components of the camera image data transfer device.

DESCRIPTION OF THE RELATED ART

Figure 11:
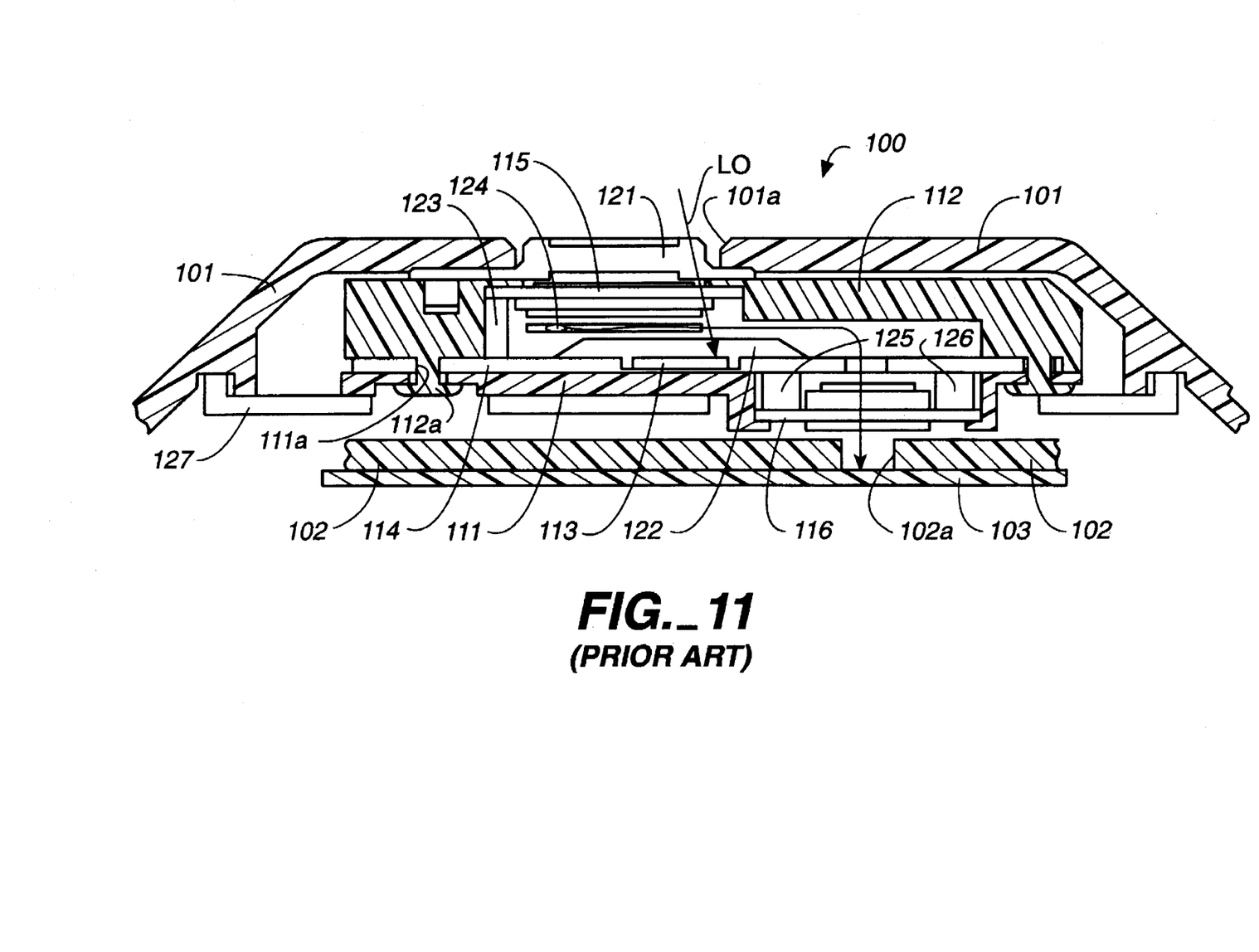
FIG. 11 is a schematic top view showing the structure of a conventional camera image data transfer device.

FIG. 11 illustrates the general configuration of a conventional camera image data transfer device. As shown in this figure, an image data transfer device 100 is placed in the space made between a rear cover 101 and a rear plate 102 which is arranged inside the camera and almost parallel to rear cover 101. A photographic film 103 travels on the opposite surface of rear plate 102, and data, such as date and time, is transferred to film 103 by exposure of light passing through an opening 102a on rear plate 102.

An image data transfer device 100 includes a first base 111 and second base 112, between which a circuit board 114 equipped with integrated circuit (IC) chip 113, a liquid crystal monitor display device 115, and another liquid crystal display 116 device for data transfer are fitted together. First base 111 and second base 112 are fixed together by securing a plurality of dowels 112a, formed on second base 112, which are put through holes 111a of the first base 111. Liquid crystal monitor display device 115 is fixed on the inner side of second base 112 in order to show various data to the user. A cover glass 121 is attached to liquid crystal display device 115 to protect it and is exposed to the outside through an opening 101a formed on rear cover 101. Liquid crystal display device 116 for data transfer is mounted on the inner side of first base 111 facing opening 102a of rear plate 102.

An IC chip 113 on circuit board 114 is covered with a molding material 122 for protection. The driving signals for liquid crystal monitor display device 115 are supplied from circuit board 114 through a plastic connector 123. Connector 123 also acts as a support to secure liquid crystal display device 115 in place by pushing it against the rear side of second base 112. A spacer 124 in turn supports connector 123 and prevents liquid crystal display device 115 from being an inclined position. Similarly, liquid crystal display device 116 for data transfer is electrically coupled to a pair of connectors 125 and 126, which push the display device against first base 111 to secure it in place. Camera image data transfer device 100 with this structure is fixed inside of the camera by means of a fixture 127.

Liquid crystal display device for data transfer 116 forms transparent pattern areas representing data to be transferred. It should be understood that the camera image data transfer device also includes optics that guide the transmitted light from the liquid crystal display device to the photographic film, although it is not shown in the figure. The display plane of the liquid crystal display device comprises two areas: a transparent pattern forming area for generating transparent pattern areas representing data to be transferred; and the rest of the display plane which is referred to as a light blocking area (a light blocking mask). Typically, the light blocking area is formed by plating or vacuum evaporation of nickel or chromium.

According to the conventional structure, the following problems have been recognized.

(1) In assembling the device, each of liquid crystal display devices 115 and 116 is fixed to the inner side of the respective base. After inserting the display and the connectors, one of the bases is flipped over and placed on the other. This must be done while the connector on the flipped base is pressed against the base so that the display device and the connector do not fall separate. There are times, however, when the pressure on the connector is insufficient to hold them in place, and the two bases are fixed together with both the display device and the connector displaced. It takes many steps to disassemble and repair this kind of defect. Accordingly the manufacturing costs increase.

(2) The external light LO incident on the cover glass, shown in FIG. 11, as an arrow may pass through the display device, a gap between the display device and the base, and the molding material to reach the IC chip. Exposing of the IC chip to light may cause the chip to malfunction. To avoid this problem the molding material covering the IC chip must block the light, and spacer 124 might also need to be made of a light blocking material.

External light coming through the cover glass may pass through the glass portion of the display device 115, circuit board 114, and then a glass portion of other display device 116 and expose the photographic film. To prevent this light leakage from occurring, circuit board 114 must be made of a light blocking material. Therefore, manufacturing costs are higher by providing a blocking light structure in each component to avoid light penetration deeply inside the device.

(3) The light blocking area of liquid crystal display device for data transfer 116 is formed by plating or vacuum evaporation of nickel or chromium. It takes in an order of magnitude of tens of minutes to complete the processes of plating or vacuum deposition. For the simultaneous processing of a large quantity, large, complex equipment is required, which again increases in manufacturing costs.

OBJECT OF THE INVENTION

It is an object of the present invention to provide an image formation apparatus which aforementioned problems and disadvantages.

It is another object of the present invention to provide a method of assemble of an image formation apparatus more easily and more efficiently without flipping either the first or the second base to combine with the other since the device has configuration that allows for the assembly of its components, with one component on top of another, from the bottom up in one direction.

It is a further object of the present invention to provide an image formation apparatus having a simple light shield structure formed in one body with the second base which prevents the external light from reaching any component inside the device.

It is an additional object of the present invention to provide an image formation apparatus having a light shield structure efficiently and inexpensively by using photoresist process.

SUMMARY OF THE INVENTION

According to a embodiment, the camera image data transfer device comprises a circuit board equipped with an IC chip, a first base placed on one side of the circuit board, a second base placed on the other side of the circuit board, a display device for image data transfer mounted on the first base, and a monitor display device mounted on the second base. In order to eliminate the aforementioned conventional drawbacks the camera image data transfer device employs a configuration that provides for the assembly of the above components with one component arranged on top of another and fixed to each other from the bottom up in one direction.

In this arrangement, the first base has a recess on the inner side thereof for mounting the display device for image data transfer; the display device for image data transfer is mounted in the recess; then the circuit board and the second base are assembled in this order from the same side; the second base has another recess for mounting the monitor display device; the monitor display device are mounted in the recess; and the monitor display device are fixed from the outer side thereof to the second base with a fixture.

The components are combined by means of a plurality of dowels formed on the inner side of the first base. The plurality of dowels go through the holes formed on the second base, and the projected ends of the plurality of dowels from the second base are secured by, for example, thermal or mechanical means Further, the fixture for fixing the monitor display device comprises a main frame and a transparent cover. The main frame is fixed to the second base; the transparent cover covers the opening of the main frame; and both the main frame and the transparent cover are formed in one body. Alternatively, a metal plate may be used to form the fixture's main body;the metal plate is fixed to the second base. Otherwise, the fixture's main frame may be secured to the second base with an adhesive.

The camera image data transfer device of the present invention includes a liquid crystal display device capable of forming transparent pattern areas representing data characters to be transferred to the photographic film loaded in the camera and optics to guide the optical beams passing through the transparent pattern areas of the liquid crystal display device to the photographic film. The liquid crystal display device comprises transparent pattern forming areas for generating the transparent pattern areas and a light blocking mask covering the display surface excluding the transparent pattern forming areas. The light blocking mask is made of a light blocking photoresist.

The liquid crystal display device comprises two glass substrates for encapsulating liquid crystal materials. At least one of the glass substrates, on its inner side in contact with the liquid crystal materials, has transparent pattern forming areas for generating the transparent pattern areas and a light blocking mask covering the display surface excluding the transparent pattern forming areas. The transparent pattern forming areas and the light blocking mask may be formed on the inner sides, in contact with the liquid crystal, of both the glass substrates. The thickness of the light blocking photoresist preferably ranges from 1.5 μm to 3.0 μm.

It is also preferable to apply a transparent photoresist to the transparent pattern forming areas. Also, it is preferable to keep the height of the step made by the transparent photoresist surface and the light blocking photoresist surface less than 2 μm. The transparent photoresist may be extended continuously to the surface of the light blocking photoresist.

Their objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

DESCRIPTION OF THE PREFERRED EMBODIMENTS

The camera image data transfer device according to the present invention is described below in detail with reference to the embodiments and drawings.

Figure 1:
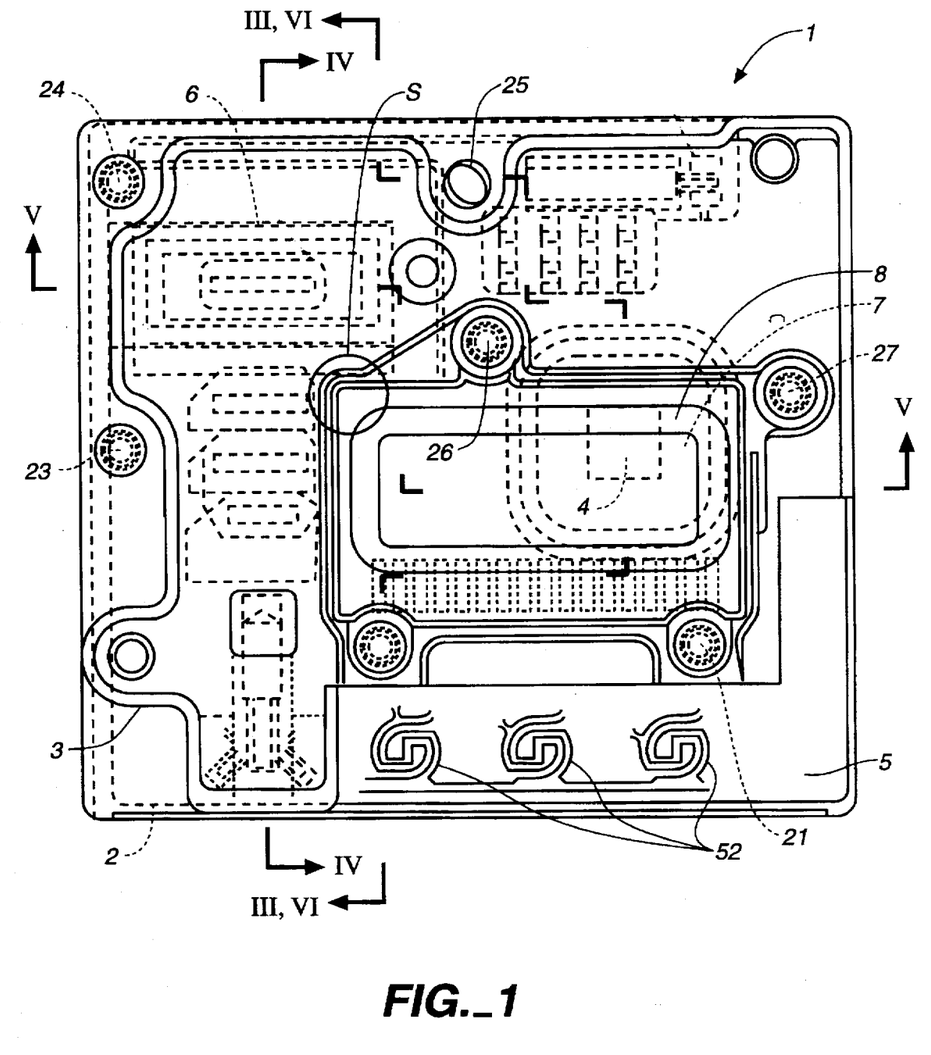
FIG. 1 is a schematic top view of An image data transfer device in accordance with one of the embodiments of the present invention.
Figure 2:
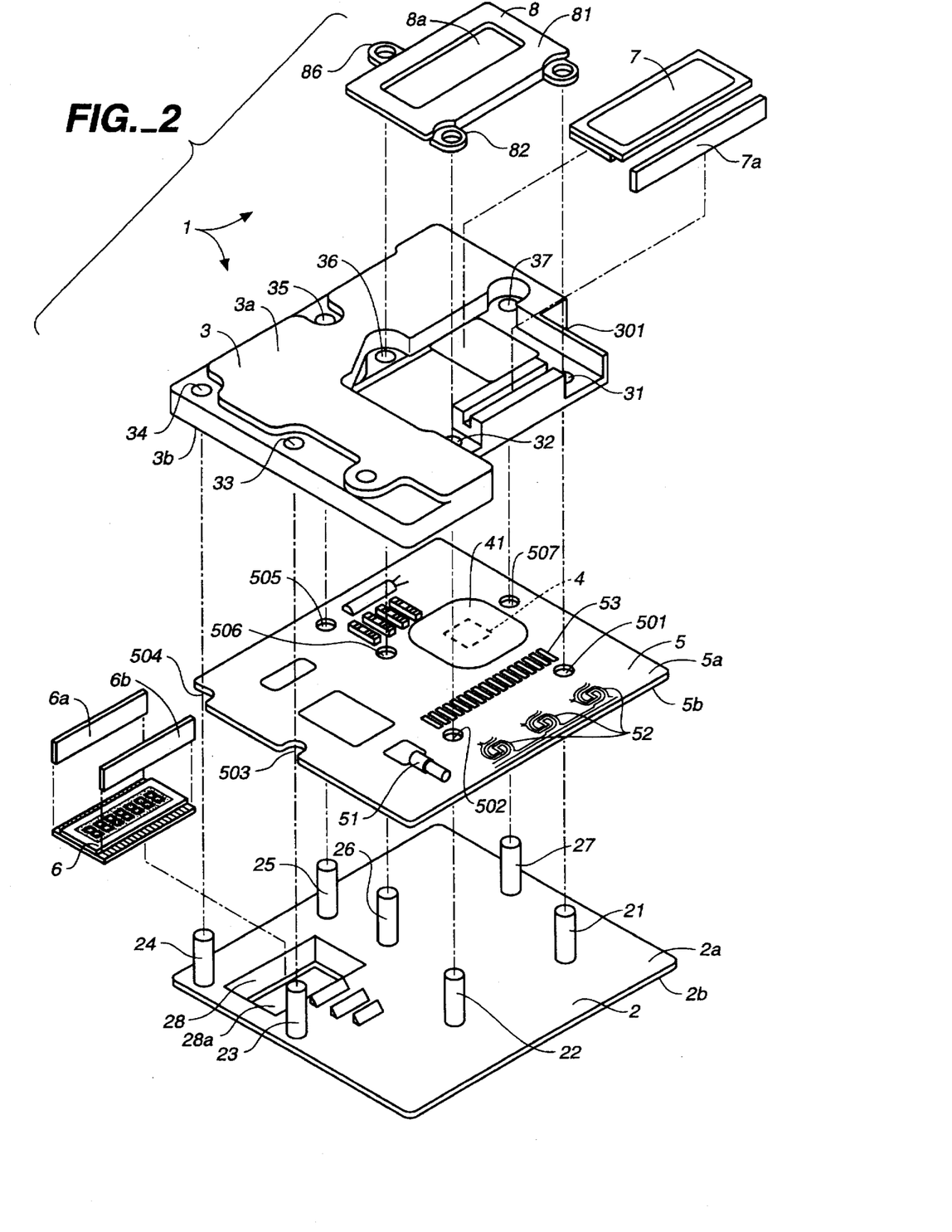
FIG. 2 is an disassembled perspective view of the camera image data transfer device in FIG. 1.

FIG. 1 is a top view of an image data transfer device 1 thereof according to the present invention, and FIG. 2 is its disassembled perspective view. As shown in these figures image data transfer device 1, of the present invention, mainly includes a first base 2, a second base 3, and a circuit board 5 equipped with an integrated circuit (IC) chip 4 sandwiched between the two bases. First base 2 has first side 2a, second side 2b and opening portion 28a penetrating through first side 2a to second side 2b Recording media,for example, photographic film is disposed under second side 2b. This is as film 103 shown in the FIG. 4. Display device 6 for image data transfer fixed on said first side and positioned over said opening portion 28a of first base 2. Circuit board 5 has also first side 5a and second side 5b and disposed on first side 2a of first base 2b. Second side 5b of circuit board 5 faces first side 2a of first base 2. Second base 3 has first side 3a and second side 3b and disposed on first side 5a of circuit board 5. Second side 3a of said second base 3 faces first side 5a of circuit board 5. A monitor display device 7 is fixed on first side 3a of said second base 3.

First base 2 includes, for example, seven dowels 21–27 formed perpendicularly on the inner surface and in one body with the base. First base 2 also includes recess 28 and an opening 28a. A liquid crystal display device 6 for data transfer fits in recess 28 and is electrically connected to circuit board 5 through connectors 6a and 6b.

Circuit board 5 comprises a lamp 51 for exposing the film, a set of switches 52, a set of terminals 53 connected with the camera's main body, as well as IC chip 4, the surface of which is covered with a molding material 41. Circuit board 5 also includes through holes and cutouts 501–507 to receive the dowels from first base 2.

Second base 3 includes through holes 31–37 to receive the seven dowels of first base 2. Another recess 301 for receiving liquid crystal monitor display device 7 is formed on the first side 3a of second base 3. Liquid crystal monitor display device 7 is placed in recess 301 and a fixture 8 secures the display device in place. Fixture 8 also comprises through holes 81, 82, and 86 for accommodating dowels 21, 22, and 26. Liquid crystal monitor display device 7 electrically connects to terminals 53 on board 5 through connector 7a.

IC chip 4 on circuit board 5 provides liquid crystal display device 6 for data transfer 6 with data signals through connector 6a and 6b. Display device 6 comprises a plurality of display digits such as seven-segment display digits, each of which forms a pattern of one character of data to be transferred to the film. It is well known that the segments of a digit that form a data character to be transferred become transparent while the rest of the segments block light. Thus, light beams from lamp 51 pass through the transparent pattern areas and project the data characters formed thereon onto the film via opening 28a.

The structure of image data transfer device 1 of the present invention allows one to assemble the aforementioned components beginning from one end in one direction. In the first step of assembling the device, first base 2 is placed so that its first side 2a faces upward. Then, liquid crystal display device 6 for data transfer is inserted in recess 28 of second base 2, and two connectors 6a and 6b are placed on top of the display device.

Next, circuit board 5 is set on top of first base 2 so that dowels 21–27 of first base 2 go through holes and cutouts 501–507 of circuit board 5. Then, similarly, second base 3 is placed on top of circuit board 5 so that dowels 21–27 of first base 2 go through holes 31–37 of second base 3.

After this, connector 7a is fixed in recess 301, formed on first side 3a of second base 3, and liquid crystal monitor display device 7 is placed on top of the connector. Fixture 8 is mounted on the liquid crystal display device so that dowels 21, 22, 26 go through holes 81, 82, and 86, respectively.

Thus, image data transfer device 1 is completed by assembling all components in one direction from the bottom of first base 2 up to second base 3 and fixture 8. Finally, the top ends of dowels 21–27 are terminated and fixedly secured thereto by either thermal or mechanical means.

Figure 3:
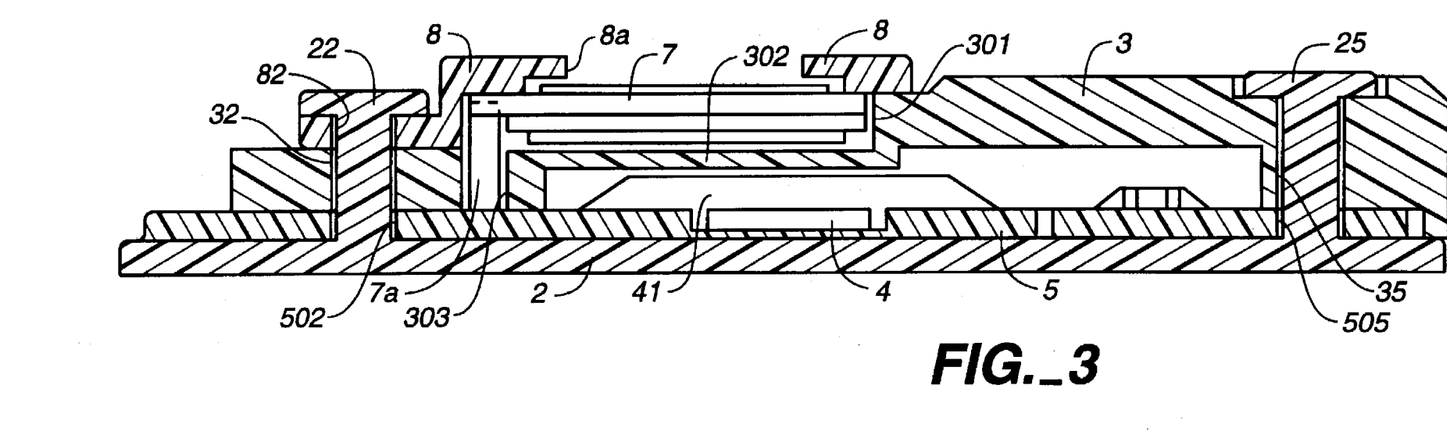
FIG. 3 is a schematic cross-sectional view of the camera image data transfer device taken along line III—III in FIG. 1.

FIG. 3 shows a cross-sectional view of the completed image data transfer device taken along line III—III shown in FIG. 1. As shown in this rise, dowels 22 and 25 formed on first base 2 project through hole 502, 505 of circuit board 5 and hole 32, 35 of second base 3. The top end of dowels 22 and 25 are terminated and flattened to secure those members fixedly together in a layer structure. Further, dowel 22 projects through hole 82 of display device fixture 8. The other dowels are similarly terminated and flattened to fix those members together.

According to this embodiment, it is advantageous that the image data transfer device can be easily and accurately assembled by integrating all the individual components since these can be built up from one end to the other toward only one direction. Further this can prevent the disadvantages and problems of assembling connectors which had been found with conventional assembly technology.

Image data transfer device 1 of the present embodiment is secured in the mounting area of the camera main body as is conventional shown in FIG. 11. Liquid crystal monitor display device 7 can be viewed from outside through opening 101a made on rear cover 101, and liquid crystal display device 6 faces the film 103 through opening 102a made on the rear plate of the main body of the camera.

Furthermore, recess 301 is made on the upper side of second base 3 so that liquid crystal monitor display device 7 just fits therein. Slit 303 is formed for inserting connector 7a along with one of the longer sides of rectangular bottom 302 of recess 301. Thus, liquid crystal monitor display device 7 is electrically connected to circuit board 5 with connector 7a inserted in slit 303. Connector 7a is preferably elastic. Hence, when liquid crystal monitor display device 7 is mounted in the camera image data transfer device, connector 7a is compressed and slightly deformed from the initial state shown in the broken line. In this way, the positioning and electrical connection of liquid crystal monitor display device 7 are achieved.

Figure 4:
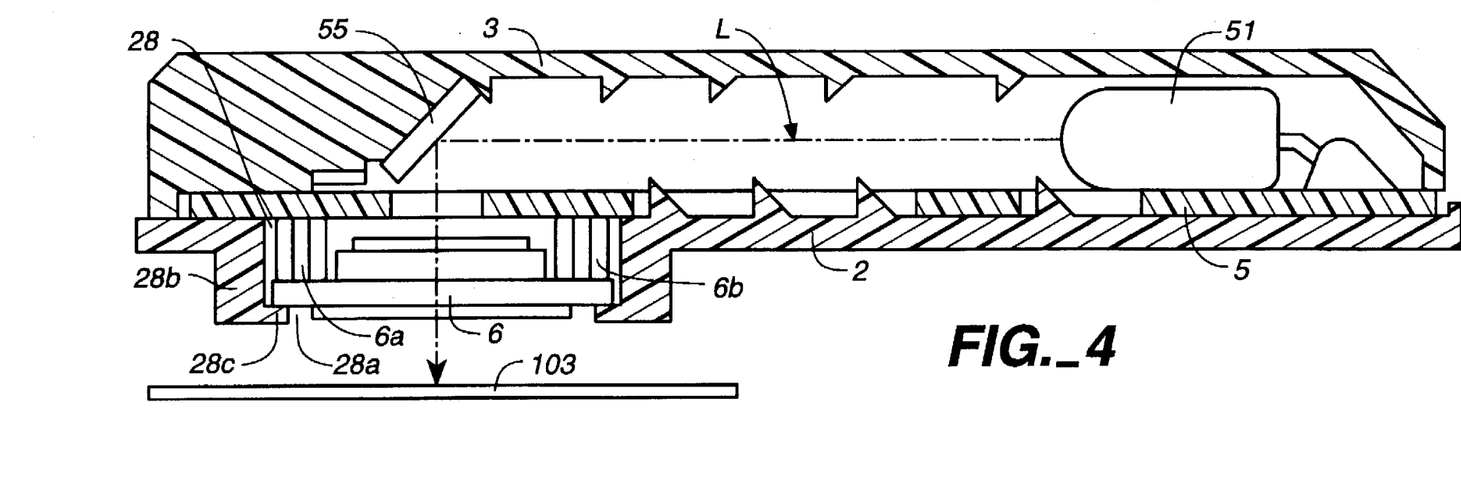
FIG. 4 is a schematic cross sectional view of the camera image data transfer device taken along line IV—IV in FIG. 2.

FIG. 4 is a cross-sectional view of the image data transfer device taken along line IV–IV shown in FIG. 1, illustrating the optics portion of the device. As shown in this figure light beams are emitted from lamp 51, mounted on circuit board 5, parallel to circuit board 5. A mirror 55 is mounted on second base 3 at an angle of 45° with respect to the optical axis L, as shown in this figure, so that the light beams are reflected 90° to be incident on liquid crystal display device 6 for data transfer. The light beams reflected with mirror 55 pass through the transparent pattern areas of liquid crystal display device 6, opening portion 28a of recess 28 and opening 102a of rear plate 102 of the camera main body and expose film 103 facing the liquid crystal display device 6 with the data.

As shown in FIG. 4, recess 28 is provided on first base 2 for mounting liquid crystal display device 6 for image data transfer. Side walls 28b of recess 28 is extended to retaining members 28c for supporting liquid crystal display device 6 on the four sides. Liquid crystal display device for image data transfer 6 is pushed against retaining members 28c by connectors 6a and 6b fixed on circuit board 5 from the other side of display device for image data transfer 6. Thus, liquid crystal display device 6 for image data transfer 6 is secured between retaining members 28c of the first base 2 and a pair of connectors 6a and 6b.

Figure 5A:
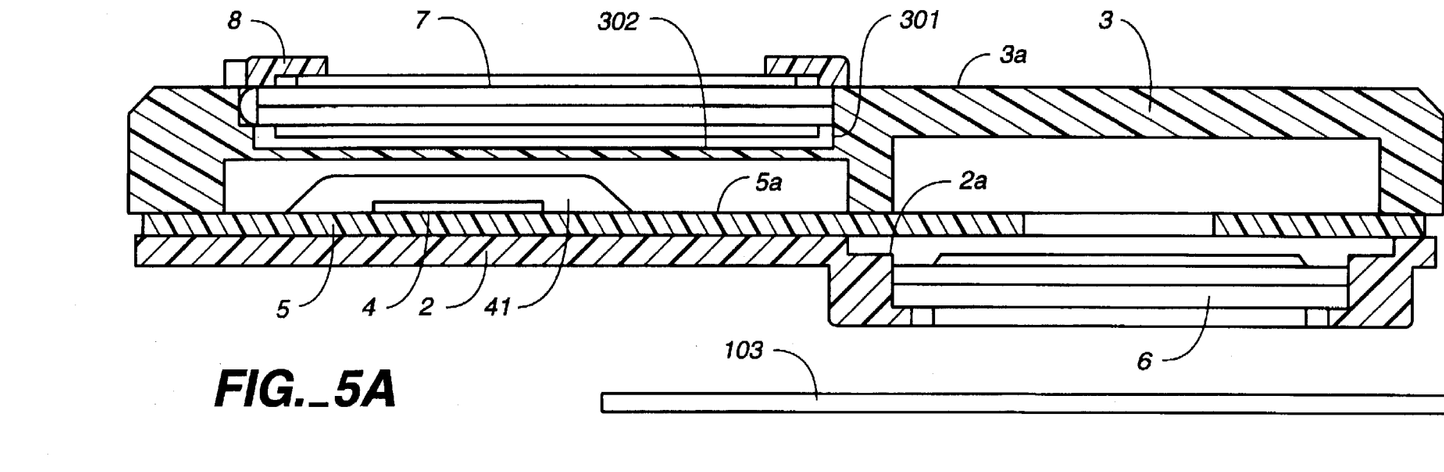
FIG. 5A is a schematic cross sectional view of the camera image data transfer device taken along line V—V in FIG. 1.
Figure 5B:
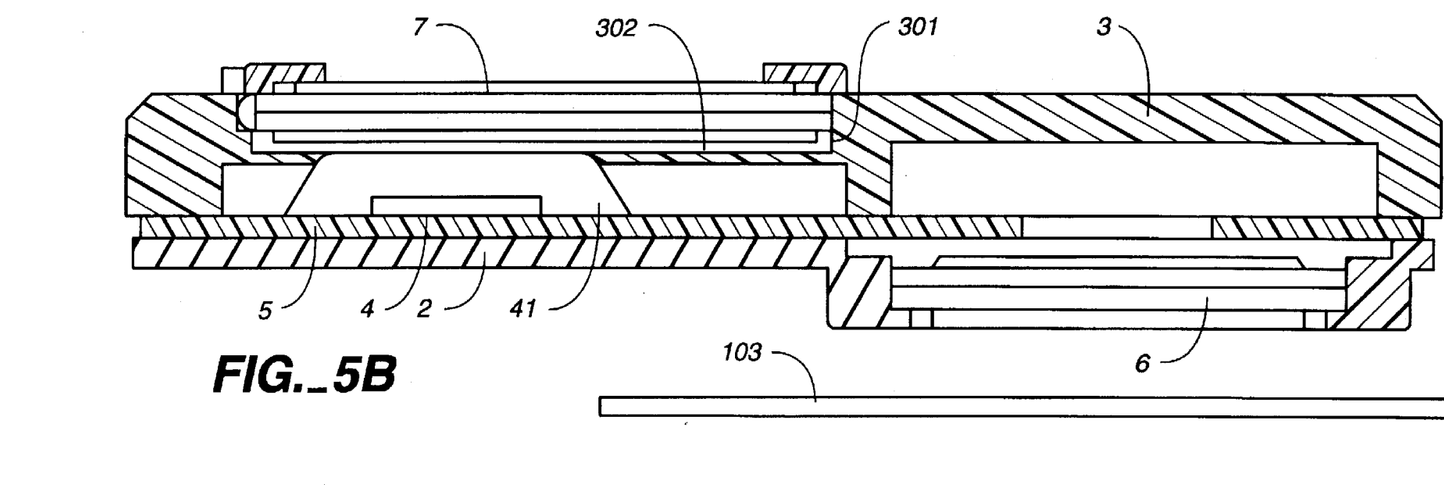
FIG. 5B is a schematic cross sectional view of the camera image data transfer device taken along line V—V in FIG. 1 including an improved light blocking base of the present invention.

FIG. 5A shows a cross-sectional view of image data transfer device i taken along line V—V in FIG. 1, including recess 301. FIG. 5B also shows a cross sectional view of data transfer device taken along line V—V in FIG. 1 including an improved light blocking base 302. According to these figures, image data transfer device I of the present embodiment includes recess 301 for display device 7 and light blocking base 302 thereof, which prevents light leaking in from outside of liquid crystal monitor display device 7.

As shown in FIG. 5A, liquid crystal monitor display device 7 is fixed on first side 3a of second base 3 and arranged above first side 5a of circuit board 5 while liquid crystal display device 6 for data transfer is fixed on first side 2a of first base 2. However, both display devices are very close to each other at one corner when they are projected along with a horizontal direction as shown in FIG. 1. The corner concerned is indicated by a circle S shown in FIG. 1. If there is no light blocking base 302, light leaking through liquid crystal monitor display device 7 passes through circuit board 5 and reaches liquid crystal display device 6 for data transfer. In the present embodiment, however, light blocking base 302 completely blocks all light.

According to FIG. 11, showing the conventional assembly method, liquid crystal monitor display device 115 is mounted on second base 112 from the bottom side which face the circuit board 114. Accordingly, the conventional structure does not allow recess 301 to have a solid light shield base 302 as the present embodiment does. The conventional structure, therefore, requires other additional measures to prevent light leaking from reaching the liquid crystal display device for data transfer. Namely, spacer 124 have to be made of vinyl chloride or sponge, and circuit board 114 is either made of a colored material or printed with a light blocking ink. The use of these additional components and special materials for the circuit board causes the manufacturing cost to increase.

Image data transfer device 1 of the present embodiment, however, has a structure that allows one to build the device by assembling the components one on top of another. Therefore, the device can be made so that recess 301 on the second base has light shield base 302, and light shield base 302 completely prevents any leaking light. Thus, the present embodiment does not require an additional light blocking base and a circuit board either made of a colored material or printed with a colored ink, thus resulting in a lower manufacturing cost. In principle, light shield base 302 may be partially formed only in the neighborhood of liquid crystal display device 6 for data transfer as shown in FIG. 5 A and B.

Light shield base 302 of the present embodiment completely separates liquid crystal monitor display device 7 from IC chip 4 mounted on circuit board 5. Thus, bottom 302 prevents light which leaks through liquid crystal monitor display device 7 from reaching IC chip 4 and hence prevents the chip from malfunctioning.

In the conventional structure, in order to prevent leaking light from reaching the IC chip, a light blocking molding material is used and/or the IC chip and the liquid crystal monitor display device are designed to separate in the horizontal direction as far as possible. The structure of the present embodiment does not impose any restrictions on the molding material and the position of the IC chip which results in a reduction in size and in manufacturing costs.

Figure 6A:
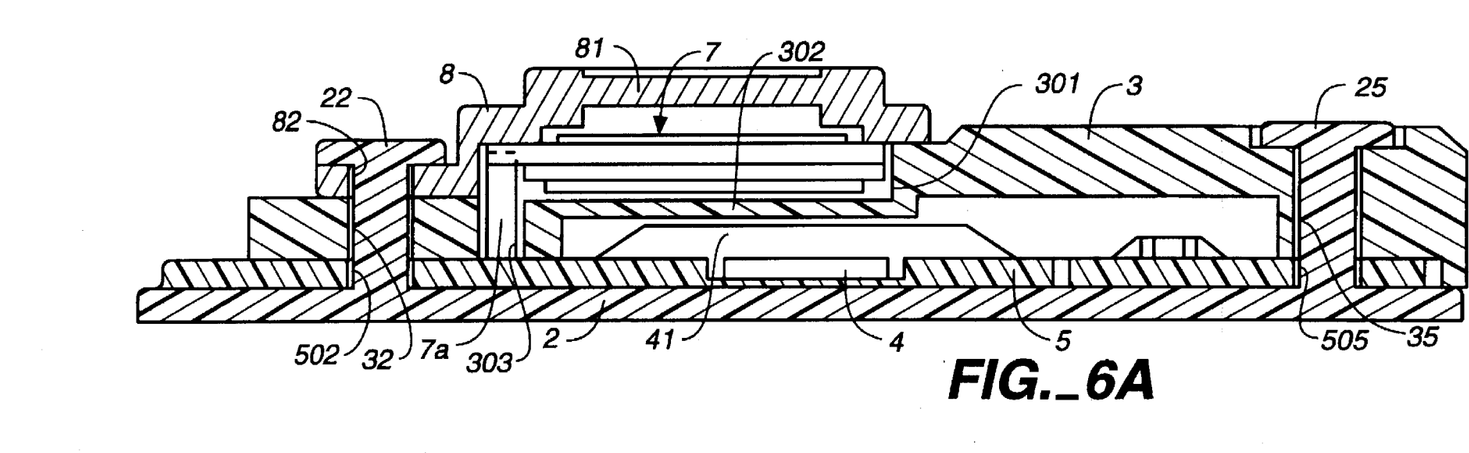
FIG. 6A is a schematic cross sectional view of the camera image data transfer device taken along line V—V in FIG. 1 including a improved fixture to fix the liquid crystal monitor display device of the present invention.

FIG. 6A shows another example of fixture 8 for fixing liquid crystal monitor display device 7. In the first embodiment shown in FIG. 3, fixture 8 is fixed to second base 3 with dowels 21, 22, and 26. These dowels also secure liquid crystal monitor display device 7. Fixture 8 has a rectangular window 8a at its center through which the user can monitor liquid crystal display device 7. According to the embodiment shown in FIG. 6A, however, the transparent cover 81 is formed in one body with fixture 8 than as a separate component. This may be achieved by making fixture 8 out of, for example, methacrylic resin, polycarbonate resin, or ABS resin. This structure requires fewer parts for making the device and hence reduces the cost of manufacturing.

With respect to FIG. 6A, it should be noted that fixture 8 and transparent cover 81 can be made as separate components rather than in one body. In this case fixture and transparent cover 81 may be made of metal and a transparent synthetic resin, respectively. In order to secure positioning of liquid crystal monitor display device 7 and its electrical connection with the circuit board, fixture 8 compresses connector 7a and slightly deforms it. Since a reactive force is exerted back to fixture 8, it must have rigidity of a high level. If the rigidity is too little and the fixture bends, secure positioning of liquid crystal monitor display device 7 and its electrical connection with the circuit board may not occur. Therefore, metal fixture 8 has an advantage because a metal typically has a greater rigidity than other materials.

Figure 6B:
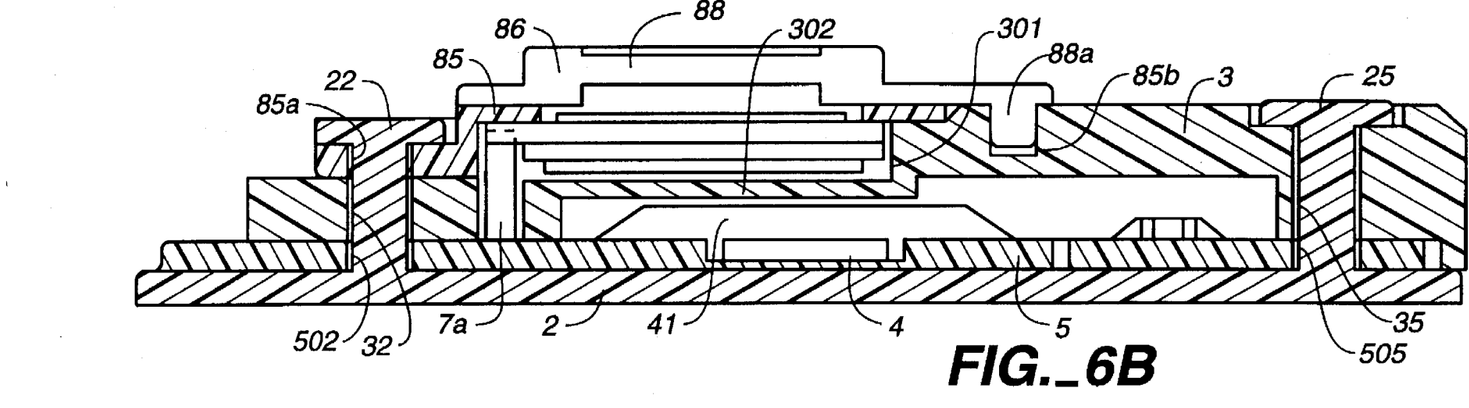
FIG. 6B is a schematic cross sectional view of the camera image data transfer device taken along line III—III in FIG. 1 including another improved fixture of the present invention.

FIG. 6B illustrates another example in which the fixture is made of a metal while the transparent cover is made of a transparent synthetic resin. In this figure, reference numeral 85 shows a display device fixture made of a metal that, as mentioned above, and includes holes 85a for dowels 21, 22, and 26 with which the fixture is securely fixed to second base 3. A reference numeral 88 denotes the transparent cover. In this example transparent cover 88 has a protrusion 88a, and second base 3 has a groove 85b. The protrusion fits into the groove and fixed by an interference. Thus, transparent cover 88 can be easily assembled from the top. Alternatively an adhesive may be used to fix transparent cover 88 on either second base 3 or the fixture.

Figure 7A:
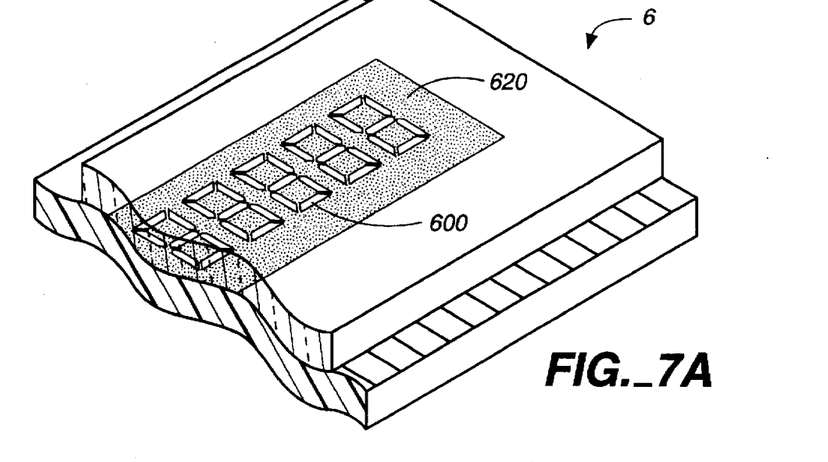
FIG. 7A is a perspective view partially showing the liquid crystal display device of FIG. 1.
Figure 7B:
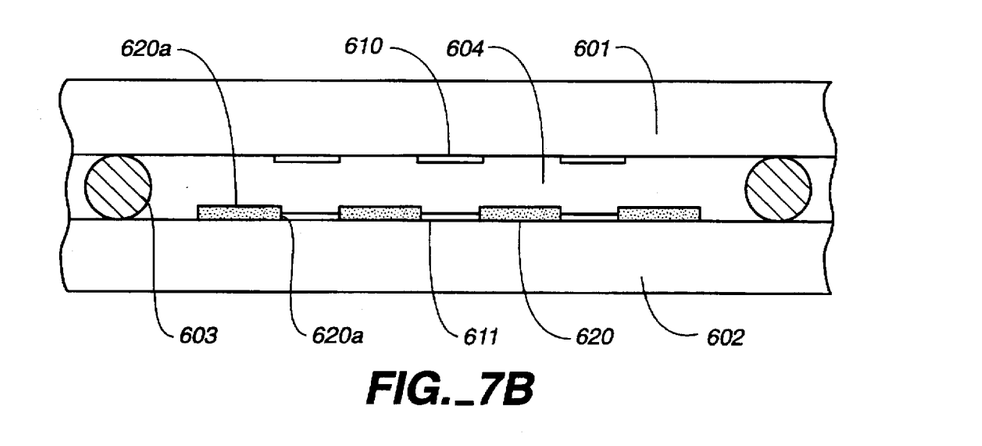
FIG. 7B is a schematic diagram showing a cross-sectional view of the liquid crystal display device of FIG. 1.
Figure 7C:
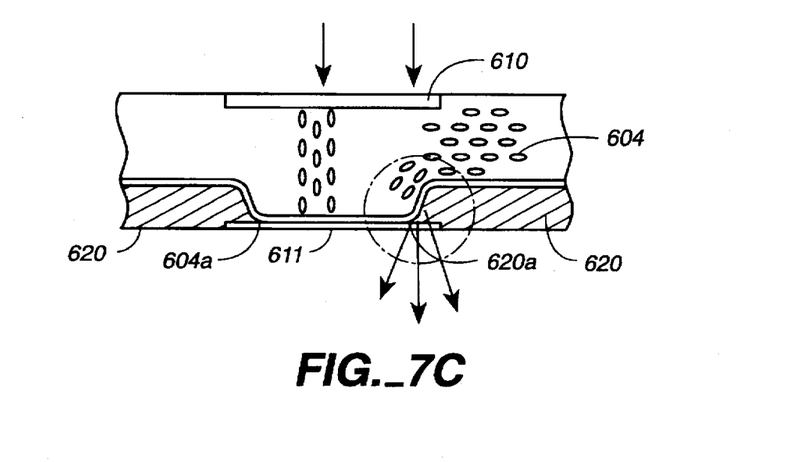
FIG. 7C shows the light scattering caused by a step formed at the edge of the light blocking mask in liquid crystal display device of FIG. 1.

FIG. 7A–C illustrate the structure of liquid crystal display device for image data transfer 6 of the present embodiment. Referring specifically to FIG. 7A, liquid crystal display device 6 is of the negative type in which segments activated with an applied voltage transmit light. Display device 6 comprises a plurality of seven-segment pattern display portion 600, each segment being formed with a pair of transparent electrodes, and each seven-segment pattern display portion being capable of representing one character. the rest of the display area is covered with a light blocking mask 620. As shown in FIG. 7B, liquid crystal material 604 is encapsulated between upper glass substrate 601 and lower glass substrate 602. Light beam from the optical path for data transfer L as shown in FIG. 4 is irradiated on an upper glass substrate 601. The light beams transmit through a lower glass substrate 602. Sealing agent 603, is fixed between an upper glass substrate 601 and a lower glass substrate 602. Transparent electrodes 610 are formed on upper glass substrate 601 and their corresponding electrodes 611, on lower glass substrate 602, are facing each other.

As described above, the rest of the display area is covered with a light blocking mask 620 which is made of a photoresist material, patterned by printing and photolithography, and which blocks leaking light caused by, for example, disorientation of the liquid crystals. The processes of forming light blocking mask 620 are, in this order, printing of the photoresist, pattern exposure, setting of the photoresist, and removal of the unnecessary photoresist. Each of the above processes has the advantage of being completed in a relatively short time. These processes do not require large equipment, uncommon chemicals or special solvents as the conventional plating and vacuum deposition of nickel and chromium do. Thus, the present processes can be readily automated in a production line, which leads to improvement of productivity, a reduction in the number of processes, and a reduction in the cost of parts. Alternatively, desired patterns may be printed by offset or silk printing instead of photolithography.

The thickness of light blocking mask 620 ranges from 1.5 μm to 3 μm. According to the experimental results by the present inventors, light blocking mask 620 must be at least 1.5 μm in thickness to block completely the light beams from light source lamp 51.

As shown in FIG. 7C, the maximum thickness is determined by the allowable level of disorder in the orientation of the liquid crystal molecules 604 at the edges 620a of light blocking mask 620. Different gaps are formed at the edges 620a of light blocking mask 620 and transparent electrodes 611. Alignment layer 604a tends to accumulate more at such differences than at other parts of the display device. Therefore, when a voltage is applied, the liquid crystals in these portions will not have a sufficient electric field to align themselves with other liquid crystals. Thus, light will be scattered there more easily as shown by the arrows in the figure. It is noted that if the thickness of light blocking mask 620 increases, the height of the differences and the accumulation of the alignment layer material also increase, resulting in an increase in light scattering.

If the orientation disorder of the liquid crystal at edges 620a of the light blocking mask is large, the light beams almost perpendicularly incident on liquid crystal display device 6 are deflected there and hence cause a degradation in the quality of data characters projected on film 103, blur and smear of characters and circular light diffusion in particular. The present inventors found that the maximum thickness of light blocking mask 620 should be less than 3 µm in order to obtain acceptable character quality.

In the present embodiment the thickness of the light blocking mask is regulated during manufacture to range between 1.5 µm and 3.0 µm. Therefore, this configuration provides for good light blocking capability as well as good quality of characters as projected on the film.

Although light blocking mask 620 is formed on lower glass substrate 602 in the present embodiment, it may be formed on the inner side of glass substrate 603 or even on both glass substrates.

Figure 8:
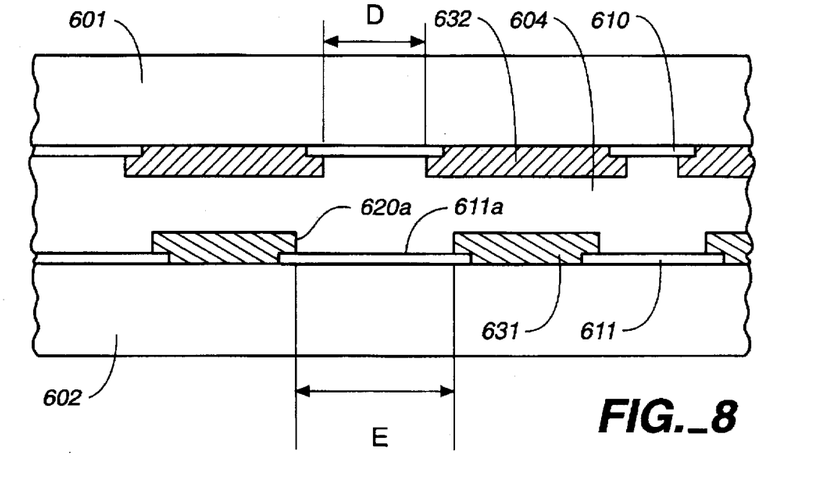
FIG. 8 is another cross-sectional view of the liquid crystal display device for data transfer of the present invention.

FIG. 8 show an example in which light blocking masks are formed on both the glass substrates. As shown in this figure, light blocking masks 631 and 632 are formed on lower and upper glass substrates 602 and 601, respectively. As explained with reference to FIG. 7, the smaller difference of light blocking mask 631 with respect to transparent electrodes 611a, the less blur and smear of the projected characters and circular light diffusion occur because of less disorder in the orientation of the liquid crystals at edges 620a of the light blocking mask. To obtain further improvement in this regard the thickness of light blocking mask 631 in FIG. 8 is reduced to less than 1.5 µm. In this embodiment another light blocking mask 632 is formed on the upper glass substrate to compensate for the reduced light blocking capability of thin light blocking mask 631. Further, the distances between the edges of respective light blocking masks 631 and 632, that is, the widths of the segments are set as follows. In the figure the width E for light blocking mask 631 is larger than the width D for light blocking mask 632. This configuration avoids a situation in which the width of each segment becomes narrower due to poor registration of the two glass substrates. In fact, the widths D and E may be equal or unequal. It simply depends upon the accuracy of manufacturing.

The configuration in FIG. 8 includes thin light blocking masks 632 and 631 formed on upper and lower glass substrates, respectively, as well as the display segments on the upper and lower glass substrates, the widths D and E of which are different. This configuration provides for good light blocking capability, excellent quality of transferred characters due to the small resultant disorder in orientation of the liquid crystals, and a low manufacturing cost. It should be noted that the width E of segments on the lower glass substrate can be narrower than the width D of segments on the upper glass substrate.

Figure 9A:
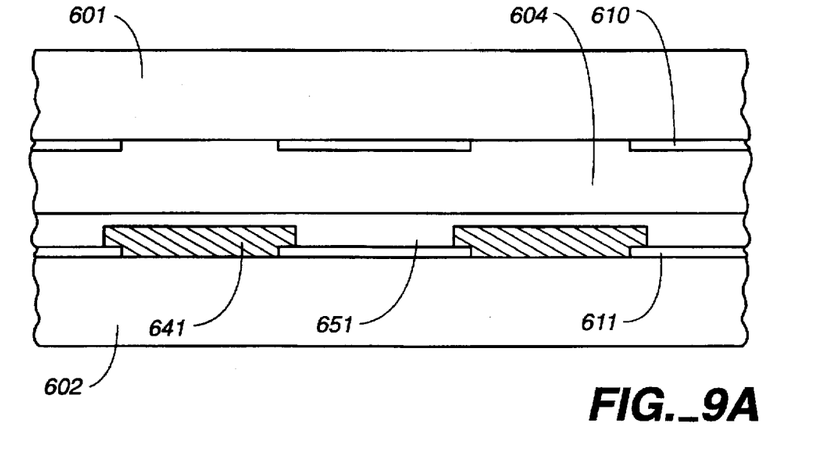
FIGS. 9A and 9B are cross-sectional view of the liquid crystal display device for data transfer the present invention.
Figure 9B:
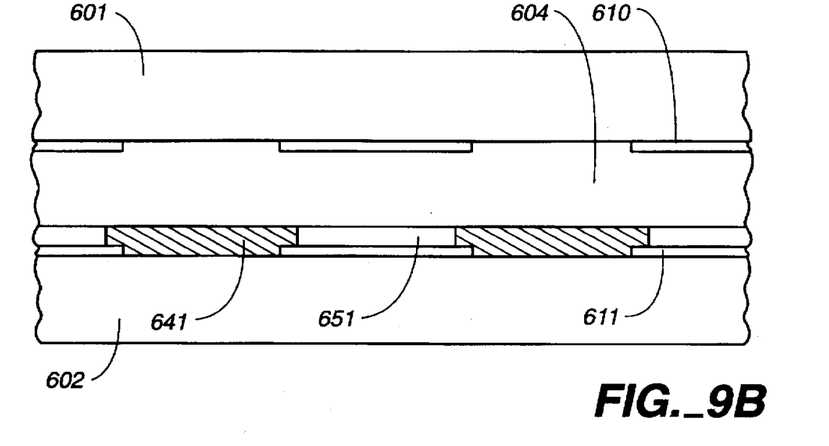

FIGS. 9A and B show two other configurations for reducing disorder in the orientation of the liquid crystals. In FIG. 9A, light blocking mask 641 formed on the inside surface of lower glass susbstrate 602, as well as the transparent segment areas, are coated with transparent photoresist 651. This coating reduces thediffernt gap between light blocking mask 641 and transparent electrodes 611.

The lowered step height reduces the orientation disorder of the liquid crystals and gives rise to a quality of transferred characters as good as that the previous configuration with no light blocking mask 641 would provide.

FIG. 9B shows another configuration in which light blocking mask 641 is formed on the inside surface of lower glass substrate 602 and transparent photoresist 651 is formed only on the portions where there is no light blocking mask (the transparent segment portions). This photoresist configuration can be achieved by exposing the structure of FIG. 9A to light to set the photoresist on the segment portions and washing away the unnecessary photoresist. The thickness of transparent photoresist 651 varies according to the intensity of the exposure light as well as the exposure time. Therefore, the difference in thickness difference between photoresist 651 and light blocking mask 641 can be easily controlled. Also, the reduced thickness of transparent photoresist will decrease the distance between the liquid crystal and the electrode giving rise to a more efficient drive condition.

The thickness difference between transparent photoresist 651 and light blocking mask 641 should be less than 2.0 µm, preferably less than 1.5 µm, to reduce the orientation disorder of liquid crystal 604. If transparent photoresist 651 is exposed after measuring the thickness of light blocking mask 641, the thickness difference can be reduced beyond the above value, even as low as zero in an optimum case.

Figure 10A:
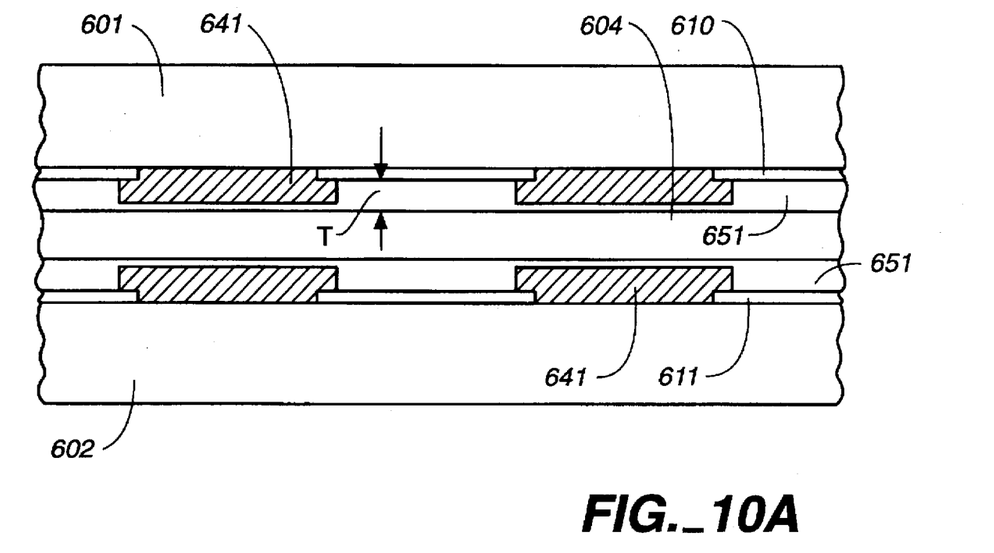
FIGS. 10A and 10B are additional cross-sectional view of the liquid crystal display device for data transfer of the present invention.
Figure 10B:
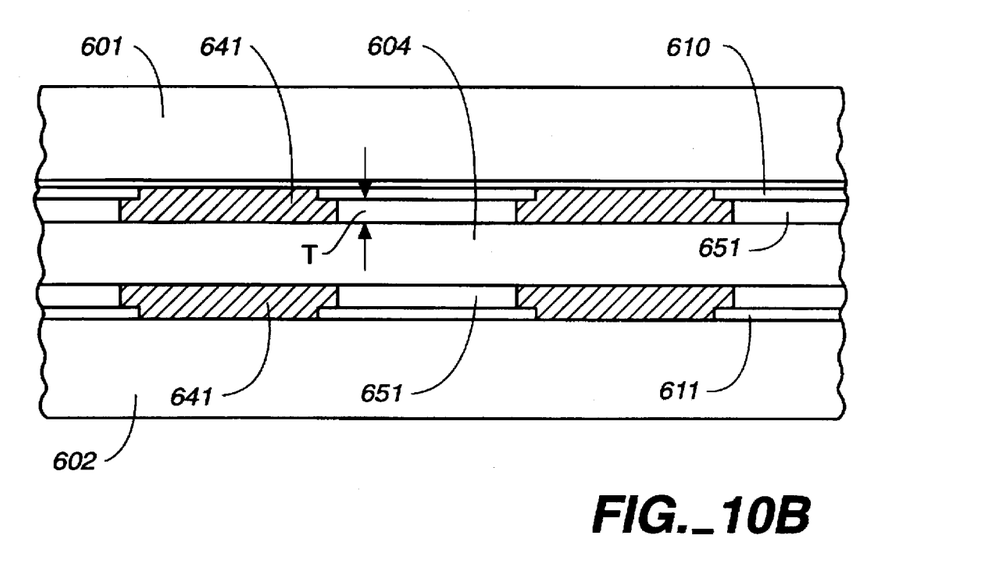

FIGS. 10A and B illustrate two other configurations in which light blocking masks 641 and transparent photoresist layers 651 are formed on the inside surfaces of both glass substrates 601 and 602, which contain the liquid crystal material 604.

The configuration shown in FIG. 10A is an extension of the configuration shown in FIG. 9A in which the structure of light blocking masks 641 and transparent photoresist layers 651 shown in FIG. 9A is built on the insides of both glass substrates 601 and 602. Transparent photoresist layers 651 cover not only transparent electrodes 610 and 611 but also light blocking masks 641.

The configuration shown in FIG. 10B is an extension of the configuration shown in FIG. 9B in which the structure of light blocking masks 641 and transparent photoresist layers 651 shown in FIG. 9B is built on the insides of both the glass substrates. Transparent photoresist layers 651 cover only transparent electrodes 610 and 611.

The light blocking mask must have at least a predetermined thickness of the distance between the surface of transparent electrode 610 or 611 and the surface of light blocking mask 641 referred as T in FIG. 10A to block light adequately. Accordingly, the thickness of transparent photoresist 651 required to fill this gap increases as the distance T increases. In the case in which light blocking masks are formed on both glass substrates 601 and 602, the thickness of each light blocking mask can be made thinner than that of the light blocking mask formed on only one glass substrate. Accordingly, the thickness of the transparent photoresist can also be made thinner. Thus, since the distance between the transparent electrodes and the liquid crystal, namely distance T can be reduced, the driving efficiency of the liquid crystal increases.

If the thickness of the light blocking mask formed on only one glass substrate is t0, then the thickness of the light blocking masks formed on both glass substrates can be approximately t0/2. Since the driving efficiency of the liquid crystal is expressed as a quadratic of this thickness, a thinner mask results in a higher driving efficiency.

In summary the camera image data transfer device of the present invention provides for the following effects:

(1) The structure of the present invention allows for assembly of its components, with one component on top of another, from the bottom up in one direction. Therefore, displacements and dropping of the components, which occur in the conventional assembly because one of the bases must be flipped over, are avoided. Accordingly, the present structure improves both production yield and productivity and reduces the assembly cost.

(2) Since the assembly of the present invention is done from the bottom up in one direction, a light blocking base can be put on the second base to block light leaking through the liquid crystal monitor display device which is also mounted on the second base. Therefore, in order to block leaking light, the present invention does not require a spacer, a colored circuit board, or a circuit board printed with a light blocking ink as the conventional device does. This leads to a reduction in the number of components and hence a reduction in manufacturing costs. Further, since the light blocking base of the present invention prevents leaking external light from reaching the IC chip, there is greater latitude in selecting a molding material and in the placement of the IC chip 11. Therefore, a reduction in the number of components is achieved resulting in a smaller, less expensive device.

(3) The light blocking mask for the liquid crystal display device for data transfer according to the present invention is formed by printing a photoresist. This process can be automated in production line more easily than the process for making the conventional light blocking mask. This contributes to an improvement in productivity and a reduction in the production cost.

While the previously described embodiments discuss the use the present inventnition with camera, those skilled in the art will appreciate that the data transfer device may be used with other recording devices ,such as, but, not, limited to, xerographic copies.

While the invention has been described in conjunction with several specific embodiments, it is evident to those skilled in the art that many further alternatives, modifications and variations will be apparent in light of the foregoing description. Thug, the invention described herein is intended to embrace all such alternatives, modifications, applications and variations as may fall within the spirit and scope of the appended claims.

What is claimed is:

1. An image data transfer apparatus for transferring image data onto recording media comprising:
   a first base having first side, second side and opening portion penetrating through said first side to said second side and said recording media disposed under said second side;
   a display device for image data transfer fixed on said first side and positioned over said opening portion of said first base;
   a plurality of dowels disposed on and extending from said first side of said first base;
   a circuit board having first and second sides disposed on said first side of said base and said second side of a circuit board faces said first side of a first base;
   a second base having first and second sides disposed on said first side of circuit board and said second side of said second base faces said first side of said circuit board;
   a plurality of holes formed on said second base for accommodating said plurality of dowels extended from said first base;
   a monitor display device fixed on said first side of said second base; and wherein
   the projected ends of said plurality of dowels are fixedly secured to said second base.

2. An image data transfer device of claim 1, wherein said first base includes a recess on said first side thereof for mounting said display device for image data transfer, said second base includes another recess on said first side thereof for mounting said monitor display device and said monitor display device is fixed with a fixture.

3. An image data transfer device of claim 2, wherein said fixture fixing said monitor display device comprises a main frame and a transparent cover, said main frame being fixed to said second base, said transparent cover covering an opening of said main frame, and both said main frame and transparent cover being formed in one body.

4. An image data transfer device of claim 2, wherein said fixture for fixing said monitor display device comprises a main frame and a transparent cover, said main frame being fixed to said second base and comprising a metal plate, and said transparent cover covering an opening of said main frame and being fixed to said second base.

5. An image data transfer device of claim 4, wherein said cover is secured to said second base with an adhesive.

6. An image data transfer device of claim 1, wherein a light blocking base is formed in one body with said second base, said light blocking base preventing external light which leaks through said monitor display device from reaching said display device for image data transfer.

7. An image data transfer device of claim 1, wherein said circuit board comprises integrated circuit chip, a light blocking base being formed in one body with said second base, said light blocking base preventing external light which leaks through said monitor display device from reaching said integrated circuit chip.

8. An image data transfer device of claim 1, wherein said display device for image data transfer is a liquid crystal display device having a light blocking mask, said light blocking mask comprising a light blocking photoresist.

9. An image data transfer device of claim 8, wherein the thickness of said light blocking photoresist ranges from 1.5 μm to 3.0 μm.

10. An method of assembling an image data transfer apparatus for transferring image data onto recording media comprising the step of:
   (a) providing a first base having first side, second side and opening portion penetrating through said first side to said second side;
   (b) fixing a display device for image data transfer on said first side of said first base and positioning over said opening portion of said first base;
   (c) disposing a circuit board having first and second sides on said first side of said base and said second side of a circuit board faces said first side of a first base;
   (d) disposing a second base having first and second sides on said first side of circuit board and said second side of said second base faces said first side of said circuit board;
   (e) fixing a monitor display device on said first side of said second base;

(f) securing said first base, said circuit board and said second base fixedly together in one direction; and performing the above steps in the order of step (a), step (b), step (c), step (d), step (e) and step (f).

11. An method of image data transfer device of claim 10, further comprising the steps of:

forming a plurality of dowels on and extending from said first side of said first base forming a plurality of holes on said second base for accommodating said plurality of dowels extended from said first base;

securing the projected ends of said plurality of dowels fixedly to said second base.

12. An method of image data transfer device of claim 10, further comprising the steps of:

forming a recess on said first side of said first base for mounting said display device for image data transfer;

forming another recess on said first side of second base for mounting said monitor display device; and fixing said monitor display device with a fixture.

13. An method of image data transfer device of claim 10, further comprising the steps of:

forming a plurality of dowels disposed on said first base and extending from said first side thereof;

forming a plurality of holes in said second base;

accumulating said plurality of dowels by said holes; and securing the projected ends of said plurality of dowels fixedly thereto.

14. An method of image data transfer device of claim 10, further comprising the steps of;

forming a light blocking base in one body with said second base for preventing external light which leaks through said monitor display device from reaching said display device for image data transfer.

15. An image data transfer device having a liquid crystal display device, said liquid crystal display device comprising:

two glass substrates for encapsulating a liquid crystal material;

a plurality of spatially separated transparent electrodes disposed on said glass substrates for forming a display pattern;

a light blocking mask disposed on one of said glass substrates and interposing said transparent electrodes; and a transparent photoresist coating said transparent electrodes for compensating a thickness gap between said light blocking mask and said transparent electrodes.

16. An image data transfer device of claim 15, wherein the thickness of said light blocking photoresist ranges from 1.5 μm to 3.0 μm.

17. An image data transfer device of claim 15, wherein a transparent photoresist is deposited to said transparent pattern forming areas.

18. The image data transfer device of claim 15, wherein the difference between a planar thickness of said transparent photoresist and a planar thickness of said light blocking mask is less than 2 μm.

19. The image data transfer device of claim 18, wherein said light blocking mask at least partially overlaps said transparent photoresist.

20. An image data transfer device having a liquid crystal display device, said liquid crystal display device comprising:

two glass substrates encapsulating a liquid crystal material;

a plurality of spatially separated transparent electrodes disposed on both of said glass substrates for forming display pattern;

a pair of opposing light blocking masks disposed on both said glass substrates interposing said transparent electrodes; and a transparent photoresist coated over said transparent electrodes for compensating a respective thickness gaps between each of said light blocking masks relative to said transparent electrodes.

21. The image data transfer device of claim 20, wherein respective widths of said light-blocking masks are dissimilar.

22. The image data transfer device of claim, 20, wherein a difference between a thickness of said transparent photoresist surface and a thickness of said light blocking mask surface is less than 2 μm.

23. An image data transfer device of claim 20, wherein said light blocking mask at least partially overlaps said transparent photoresist.

24. An method of assembling image data transfer device having a liquid crystal display, comprising the steps of:

disposing a plurality of spatially separated transparent electrodes on at least one of the opposing glass substrates;

disposing a light blocking mask on the at least one of the glass substrates interposing said transparent electrodes;

coating a transparent photoresist over the transparent electrodes for compensating a thickness gap between the light blocking mask and the transparent electrodes; and encapsulating a liquid crystal material between the two glass substrates.

25. An method of assembling image data transfer device of claim 24, further comprising the step of at least partially overlapping said light blocking mask with said transparent photoresist.

* * * * *